Sept. 1, 1964   G. A. DU ROCHER   3,147,423
PLURAL D.C. MOTOR SHORT CIRCUIT PREVENTION REVERSING CIRCUIT
Filed Aug. 20, 1962
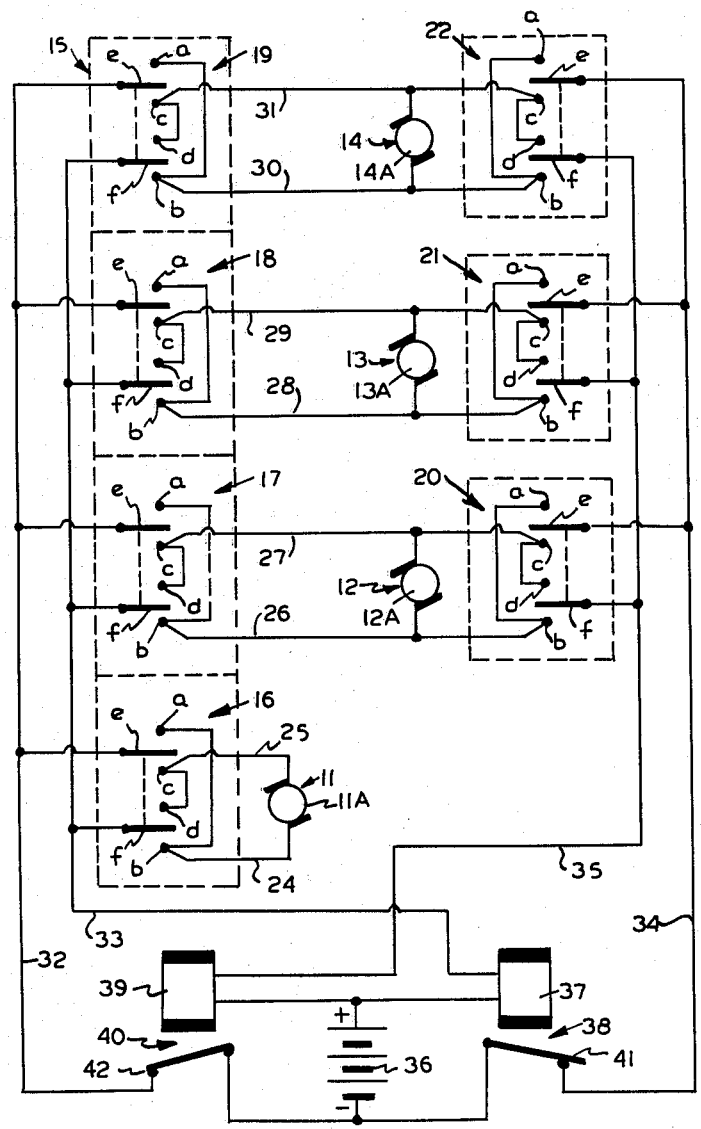
INVENTOR
GIDEON A. DuROCHER
BY *Robert D. Sommer*
AGENT United States Patent Office 3,147,423
Patented Sept. 1, 1964

1

3,147,423
PLURAL D.C. MOTOR SHORT CIRCUIT PREVENTION REVERSING CIRCUIT
Gideon A. Du Rocher, Mount Clemens, Mich., assignor to Essex Wire Corporation, Fort Wayne, Ind., a corporation of Michigan
Filed Aug. 20, 1962, Ser. No. 217,835
4 Claims. (Cl. 318—280)

This invention relates to control circuits for the electric operating motors of automotive vehicle windows, and more particularly to control circuits for reversible electric D.C. motors of the type having permanent magnet field excitation where the function of the motors is to raise and lower the windows of an automotive vehicle in response to operation of manual control switches.

In many modern automotive vehicles, the sliding window of each door is provided with a reversible electric motor for moving the window between open and closed positions. Generally, these motors have been D. C. motors of the split field type. A driver window control comprising a switch for each motor is located on the door adjacent the vehicle driver. In addition, a passenger window control switch for the motor in each of the other doors is located in its respective door and is connected in parallel with the corresponding switch of the driver control.

It has been proposed to use D. C. motors having permanent magnet field excitation for operating the windows of automotive vehicles. Such motors may be operated in reverse directions by merely reversing the direction of current flow through the motor armatures with conventional double pole, double throw reversing switches. However, a serious problem arises from the use of such motors in the above described control system where the two control switches for each motor are connected in parallel between the motor and the vehicle power supply. If the driver and a passenger concurrently actuate their respective control switches to operate a particular window motor in opposite directions, the parallel connected switches simultaneously connect the motor to the vehicle power supply with opposite polarities, thus short-circuiting the power supply through the two control switches. As the motor is not energized under these conditions and cannot operate its window, both the driver and the passenger may maintain their respective switches actuated, possibly causing serious damage to the vehicle electrical system.

Accordingly, it is an object of this invention to provide an improved control circuit for vehicle window operating motors of the type having permanent magnet field excitation wherein concurrent actuation of duplicate reversing control switches to effect different directions of motor operation will not short-circuit the vehicle power supply.

Another object of the invention is to provide an economical and simple control circuit for vehicle window operating motors of the type having permanent magnet field excitation wherein the actuation of one motor reversing control switch disconnects the corresponding reversing control switch from the vehicle power supply.

In a vehicle window system including window operating motors of the type having permanent magnet field excitation and selectively energized from the vehicle power source by means of duplicate passenger-operated and driver-operated polarity reversing switches, there is provided in a control circuit according to this invention a first relay having a normally closed switch connected in the energizing circuits for the passenger-operated switches and an operating coil connected in the energizing circuits for the driver-operated switches. In addition, there may be provided a second relay having a normally

2 closed switch connected in the energizing circuits for the driver-operated switches and having an operating coil connected in the energizing circuits for the passenger-operated switches. Energization of either relay coil in response to current flow in any of its respective energization circuits causes its relay switch to open the other energizing circuits thus preventing concurrent energization of any window operating motor by both a driver-operated and a passenger-operated switch.

Other features and advantages of the invention will be apparent from consideration of the following description taken in connection with the accompanying drawing in which the single figure shows a schematic wiring diagram of a control circuit for window raising and lowering motors in accordance with the present invention.

The drawing shows a control circuit for use in the window system of an automotive vehicle having four power operated windows which are located, respectively, in the left hand front, the left hand rear, the right hand front and the right hand rear portions of the passenger compartment of the vehicle. However, it will be understood that the invention is applicable to vehicles having other numbers and locations of power operated windows.

In the circuit illustrated by the drawing, the reference characters 11A, 12A, 13A and 14A designate, respectively, the armatures of reversible D. C. motors 11, 12, 13 and 14 of a well known type having a stator with permanent magnet field poles for field excitation. As mentioned above, the direction of rotation of such motors is reversed by reversing the direction of current flow in the motor armatures. The motors 11, 12, 13 and 14 are suitably located to operate, respectively, the left hand front, the left hand rear, the right hand front and the right hand rear windows of a vehicle. Each motor is operatively connected by any suitable operating mechanism to its respective window for moving the window to an open position when the motor shaft rotates in one direction and for moving the window to a closed position when the motor shaft rotates in the opposite direction. As the particular construction of such window operating mechanism is well known and forms no part of the present invention, it has not been illustrated in the drawing.

The means for selectively controlling the energization of the motor armatures 11A, 12A, 13A and 14A includes a gang assembly 15 of four normally open, double pole, double throw, reversing switches 16, 17, 18 and 19, respectively. The gang assembly 15 is preferably located adjacent the left front window of the vehicle for manual operation by the vehicle driver. Three individual normally open, double pole, double throw, reversing switches 20, 21 and 22 are also provided for selectively controlling energization of the motor armatures 12A, 13A and 14A, respectively. The switches 20, 21 and 22 are preferably located adjacent the left rear, right front and right rear windows, respectively, for manual operation by the vehicle passengers. Each of the switches 16–22 has a first pair of electrically connected stationary contacts $a$ and $b$, a second pair of electrically connected stationary contacts $c$ and $d$, a first movable contact element or arm $e$ movable from a normal neutral off position into engagement with either of contacts $a$ and $c$, and a second movable contact element or arm $f$ movable concurrently with contact arm $e$ from a neutral off position into engagement with either of the contacts $b$ or $d$. The switches 16–22 may be of a type such as is illustrated in the United States Patent No. 2,961,519, issued November 22, 1960 to Wilson Sadowsky and Charles L. Burns.

The switches 16–22 are connected in separate energization circuits providing different current paths to each of the motor armatures 11A, 12A, 13A and 14A. The contact pairs $a$, $b$ and $c$, $d$ of the switch 16 are connected to the motor armature 11A by the lines 24 and 25, respectively, while the contact pairs a, b and c, d of switches 17 and 20 are connected to the motor armature 12a by the lines 26 and 27, respectively. Similarly, the contact pairs a, b and c, d of the switches 18 and 21 are connected to the motor armature 13A by the lines 28 and 29; and the contact pairs a, b and c, d of the switches 19 and 22 are connected to the motor armature 14A by the lines 30 and 31, respectively. The contact arms e and f of the switches 16–19 are connected, respectively, to the lines 32 and 33, while the contact arms e and f of the switches 20–22 are connected, respectively, to the lines 34 and 35.

It will be seen that if the lines 32 and 34 are connected directly to the negative terminal of a unidirectional power source such as the vehicle battery 36, and the lines 33 and 35 are connected directly to the positive terminal of the battery 36, the switches 16–22 may be individually actuated to connect any of the motor armatures 11A, 12A, 13 and 14A in either polarity relation to the battery 36. Thus, if any one of the switches is actuated in an upward direction, a positive potential is applied to the upper side of the respective motor armature. On the other hand, the actuation in a downward direction of any switch causes a positive potential to be applied to the lower side of the respective motor armature. Obviously, if both switches of any pair of switches 17 and 20, 18 and 21, or 19 and 22 are concurrently actuated in opposite directions, the two actuated switches would connect both terminals of the battery 36 to each side of the motor armature, thus short-circuiting the battery 36 through the actuated switches.

In accordance with the present invention, the above described unsatisfactory operating condition is eliminated by connecting the line 33 to one side of the series operating coil 37 of the relay 38 and the line 35 to one side of the series operating coil 39 of the relay 40. The other side of each relay coil 37, 39 is connected to the positive terminal of the battery 36. The relay 38 has a normally closed switch 41 connecting the line 34 to the negative terminal of the battery 36 while the relay 40 has a normally closed switch 42 connecting the line 32 to the negative terminal of the battery 36. Current flow through either of the relay coils 37 or 39 to one of the motor armatures causes the respective relay switch 41 or 42 to open. As the energizing circuits of the switches 20–22 are interrupted when the relay switch 41 is opened in response to current flow through the relay coil 37 to any of the switches 16–19, it is evident that a prior closing of any of the switches 16–19 prevents energization of the motor armatures 12A, 13A and 14A through any of the energization circuits of the switches 20–22 until such closed switch is reopened. Similarly, a prior closing of any of the switches 20–22 energizes the relay coil 39 which opens the relay switch 42 to interrupt the energizing circuits of the switches 16–19.

While a particular embodiment of the invention has been shown and described, modifications thereof may be made and it is intended to cover all such modifications as fall within the scope of the invention as claimed.

What is claimed is:

1. In a vehicle window system including a plurality of reversible D.C. window operating motors for individually controlling a plurality of windows, each of said motors having permanent magnet field excitation and an armature through which current may pass in opposite directions to reverse the direction of rotation of said motor, and a unidirectional voltage source having first and second terminals for energizing said motor; a control circuit comprising:

(a) first energizing circuits and second separate energizing circuits between said source and said armatures providing two different current paths from said source terminals to each of said armatures;

(b) a first set of individually operable, double pole, double throw switches connected in said first energizing circuits, each switch of said first set being manually operative from a neutral open position to either of two positions effecting opposite directions of current flow through the respective one of said armatures;

(c) a second set of individually operable double pole, double throw switches connected in said second energizing circuits, each switch of said second set being manually operative from a neutral open position to either of two positions effecting opposite directions of current flow through the respective one of said armatures;

(d) said first energizing circuits including a first normally closed relay switch connecting one pole of each switch of said first set to said first terminal of said source, said first relay switch being effective when open to interrupt all of said first energizing circuits;

(e) said second energizing circuits including a second normally closed relay switch connecting one pole of each switch of said second set to said first terminal of said source, said second relay switch being effective when open to interrupt all of said second energizing circuits;

(f) said second energizing circuits including a first operating coil for said first relay switch connecting the other pole of each switch of said second set to said second terminal of said source, said first operating coil being responsive to current flow in any of said second energizing circuits to open said first relay switch; and (g) said first energizing circuits including a second operating coil for said second relay switch connecting the other pole of each switch of said first set to said second terminal of said source, said second operating coil being responsive to current flow in any of said first energizing circuits to open said second relay switch.

2. In a vehicle window system including a plurality of reversible D.C. window operating motors for individually controlling a plurality of windows, each of said motors having permanent magnet field excitation and an armature through which current may pass in opposite directions to reverse the direction of rotation of said motor, and a unidirectional voltage source having two terminals for energizing said motors; a control circuit comprising:

(a) first energizing circuits and second separate energizing circuits between said source and said armatures providing two different current paths from said source terminals to each of said armatures;

(b) a first set of individually operable, double throw switches connected in said first energizing circuits, each switch of said first set being manually operative from a neutral open position to either of two positions effecting opposite directions of current flow through the respective one of said armatures;

(c) a second set of individually operable, double throw switches connected in said second energizing circuits, each switch of said second set being manually operative from a neutral open position to either of two positions effecting opposite directions of current flow through the respective one of said armatures;

(d) said first energizing circuits including a first normally closed switch connecting each switch of said first set to said source, said first normally closed switch being effective when open to interrupt all of said first energizing circuits;

(e) said second energizing circuits including a second normally closed switch connecting each switch of said second set to said source, said second normally closed switch being effective when open to interrupt all of said second energizing circuits;

(f) said second energizing circuits including a first operating means for said normally closed switch connecting each switch of said second set to said source, said first operating means being responsive to current flow in any of said second energizing circuits to open said first normally closed switch; and (g) said first energizing circuits including a second operating means for said second normally closed switch connecting each switch of said first set to said source, said second operating means being responsive to current flow in any of said first energizing circuits to open said second normally closed switch.

3. In a vehicle window system including a reversible D.C. window operating motor for operating a window in either of two directions, said motor having permanent magnet field excitation and an armature through which current may pass in opposite directions to reverse the direction of rotation of said motor, and a unidirectional voltage source having first and second terminals for energizing said motor; a control circuit comprising:

(a) a first energizing circuit and a second energizing circuit connected between said source and said armature providing two different current paths from said source terminals to said armature;

(b) a first double pole, double throw switch connected in said first energizing circuit and being manually operable from a neutral open position to either of two positions effecting opposite directions of current flow through said armature;

(c) a second double pole, double throw switch connected in said second energizing circuit and being manually operable from a neutral open position to either of two positions effecting opposite directions of current flow through said armature;

(d) said first energizing circuit including a first normally closed relay switch connecting one pole of said first double pole switch to said first terminal of said source, said first relay switch being effective when open to interrupt said first energizing circuit;

(e) said second energizing circuit including a second normally closed relay switch connecting one pole of said second double pole switch to said first terminal of said source, said second relay switch being effective when open to interrupt said second energizing circuit;

(f) said second energizing circuit including a first operating coil for said first relay switch connecting the other pole of said second double pole switch to said second terminal of said source, said first operating coil being responsive to current flow in said second energizing circuit to open said first relay switch; and (g) said first energizing circuit including a second opperating coil for said second relay switch connecting the other pole of said first double pole switch to said second terminal of said source, said second operating coil being responsive to current flow in said first energizing circuit to open said second relay switch.

4. In a vehicle window system including a reversible D.C. window operating motor for operating a window in either of two directions, said motor having permanent magnet field excitation and an armature through which current may pass in opposite directions to reverse the direction of rotation of said motor, and a unidirectional voltage source having two terminals for energizing said motor; a control circuit comprising:

(a) a first energizing circuit and a second energizing circuit connected between said source and said armature providing two different current paths from said source terminals to said armature;

(b) a first double throw switching means connected in said first energizing circuit and being manually operable from a neutral open position to either of two positions effecting opposite directions of current flow through said armature;

(c) a second double throw switching means connected in said second energizing circuit and being manually operable from a neutral open position to either of two positions effecting opposite directions of current flow through said armature;

(d) said first energizing circuit including a first normally closed switch connecting said first switching means to said source, said first switch being effective when open to interrupt said first energizing circuit;

(e) said second energizing circuit including a second normally closed switch connecting said second switching means to said source, said second switch being effective when open to interrupt said second energizing circuit;

(f) said second energizing circuit including a first operating means for said first switch connecting said second switching means to said source, said first operating means being responsive to current flow in said second energizing circuit to open said first switch; and (g) said first energizing circuit including a second operating means for said second switch connecting said first switching means to said source, said second operating means being responsive to current flow in said first energizing circuit to open said second switch.

References Cited in the file of this patent

UNITED STATES PATENTS

| | | |
|---|---|---|
| 1,414,409 | Harvey | May 2, 1922 |
| 2,264,993 | McShane | Dec. 2, 1941 |
| 2,299,887 | Fell | Oct. 27, 1942 |
| 2,621,037 | Riedel | Dec. 9, 1952 |
| 3,064,172 | Young et al. | Nov. 13, 1962 |